US012297748B2

(12) United States Patent
Chiasson et al.

(10) Patent No.: US 12,297,748 B2
(45) Date of Patent: May 13, 2025

(54) SYSTEM AND METHOD OF PERFORMING FAN TRIM BALANCING

(71) Applicant: Pratt & Whitney Canada Corp., Longueuil (CA)

(72) Inventors: Matthew Chiasson, Milton (CA); Golnaz Shaverdi, Montreal (CA); Jason Tremblay, Montreal (CA); Guy Riverin, Montreal (CA); Faran Hafeez, Mississauga (CA); Bruce Calvert, Burlington (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/123,659

(22) Filed: Mar. 20, 2023

(65) Prior Publication Data

US 2024/0318563 A1 Sep. 26, 2024

(51) Int. Cl.
*F01D 5/26* (2006.01)
*F01D 21/00* (2006.01)

(52) U.S. Cl.
CPC ............. *F01D 5/26* (2013.01); *F01D 21/003* (2013.01); *F05D 2260/83* (2013.01); *F05D 2260/96* (2013.01)

(58) Field of Classification Search
CPC ...... F01D 5/26; F01D 21/003; F05D 2260/83; F05D 2260/96
See application file for complete search history.

(56) References Cited

U.S. PATENT DOCUMENTS

| | | | | |
|---|---|---|---|---|
| 4,485,678 | A * | 12/1984 | Fanuele | G01H 1/003 73/660 |
| 6,027,239 | A * | 2/2000 | Ghassaei | G01H 1/003 700/71 |
| 7,957,851 | B2 * | 6/2011 | Braswell | F01D 5/027 701/31.4 |
| 8,308,435 | B2 | 11/2012 | Storace et al. | |
| 9,243,970 | B2 * | 1/2016 | Borwankar | G01M 1/22 |
| 9,347,321 | B2 * | 5/2016 | Heidari | G01M 1/20 |
| 10,239,635 | B2 * | 3/2019 | Nakhjavani | G01M 1/32 |
| 10,343,784 | B2 * | 7/2019 | Nakhjavani | F04D 29/662 |
| 11,261,740 | B2 | 3/2022 | Stefanovic | |
| 2015/0073627 | A1 * | 3/2015 | Fang | B64C 27/008 701/3 |

(Continued)

FOREIGN PATENT DOCUMENTS

GB 2319812 A 6/1998

OTHER PUBLICATIONS

Extended European Search Report for European Application No. 24164953.2 mailed Feb. 18, 2025.

*Primary Examiner* — J. Todd Newton
(74) *Attorney, Agent, or Firm* — Carlson, Gaskey & Olds, P.C.

(57) ABSTRACT

A control system for a turbine engine assembly includes a controller operable to control operation of the turbine engine assembly and to determine a trim configuration to balance a rotating engine structure associated with the turbine engine assembly. The controller is programmed to determine the trim configuration based on information indicative of an out of balance condition of the rotating engine structure and an assigning a quality score based on a determined veracity of the information.

20 Claims, 3 Drawing Sheets

(56) References Cited

U.S. PATENT DOCUMENTS

| | | | | |
|---|---|---|---|---|
| 2015/0177091 | A1* | 6/2015 | Calvert | F01D 5/027<br>73/462 |
| 2017/0145854 | A1 | 5/2017 | Skilton et al. | |
| 2018/0119628 | A1* | 5/2018 | Zeller | F02C 9/00 |
| 2022/0119131 | A1 | 4/2022 | Tsang et al. | |

* cited by examiner

SYSTEM AND METHOD OF PERFORMING FAN TRIM BALANCING

TECHNICAL FIELD

The present disclosure relates generally to a system and method for determining a trim weight configuration for installation into an engine to reduce vibration.

BACKGROUND

A turbine engine includes rotating structures such as fans, compressor rotors and turbine rotors. Rotating structures may degrade over time and become unbalanced. Unbalanced rotational structures may cause, among other possible things, noticeable vibration and noise. Imbalanced conditions are corrected by installing weights at selected locations on the rotating structure. The determination of how much weight and where to place the weight is conventionally performed utilizing special equipment during ground based maintenance operations. The process requires aircraft downtime along with specialized training to obtain the desired trim weight configuration. The effort involved in installing the special equipment and performing the tests required to obtain the trim weight configuration can limit the frequency of balancing operations and may require several iterations of such testing to achieve the desired reduction in engine vibration and/or noise.

SUMMARY

A control system for a turbine engine assembly according to a disclosed embodiment, includes, among other possible things, a controller operable to control operation of the turbine engine assembly and to determine a trim configuration to balance a rotating engine structure associated with the turbine engine assembly, the controller including a processor and a memory for storing information indicative of operation of the rotating engine structure, wherein the controller is programmed to determine the trim configuration by, receiving information from one or more sensors within the turbine engine assembly that is indicative of an out of balance condition of the rotating engine structure, analyzing data provided by the one or more sensors to determine a veracity of the provided data and assigning a quality score based on the determined veracity, storing the information and the quality score as a data set in the memory that corresponds with one of a predefined number of engine operating ranges; providing a means of selecting one or more stored data sets for use in determining a trim configuration, and generating a new trim configuration based on selected ones of the data sets.

A method of determining a trim configuration for balancing rotating engine structure with a controller configured to control operation of an engine according to another disclosed embodiment includes, among other possible things, receiving information with the controller from one or more sensors associated with the engine that is indicative of an out of balance condition of the rotating engine structure, analyzing data provided by the one or more sensors to determine a veracity of the provided data and assigning a quality score based on the determined veracity, storing the information and the quality score as a data set corresponding with one of a predefined number of engine operating ranges, providing a means of selecting one or more stored data sets for use in determining a trim configuration, and generating a new trim configuration based on the selected data sets.

An engine assembly for an aircraft according to another example embodiment includes, among other possible things, at least one rotating engine structure having a plurality of locations configured to receive a weight element according to a determined trim configuration, one or more sensor systems configured for measuring rotation of the at least one rotating engine structure and for generating signals indictive of balance conditions of the at least one rotating engine structure, and a controller operable to control operation of the engine assembly and for determining the trim configuration. The controller including a processor and a memory for storing information indicative of operation of the rotating engine structure, wherein the controller is programmed to determine the trim configuration by receiving information from the one or more sensor systems associated with the engine assembly that is indicative of an out of balance condition of the at least one rotating engine structure, analyzing the information provided by the one or more sensor systems to determine a veracity of the provided information and assigning a quality score based on the determined veracity, storing the information and the quality score as a data set in the memory that corresponds with one of a predefined number of engine operating ranges, providing a means of selecting one or more stored data sets for use in determining a trim configuration, and generating a new trim configuration based on selected ones of the data sets.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
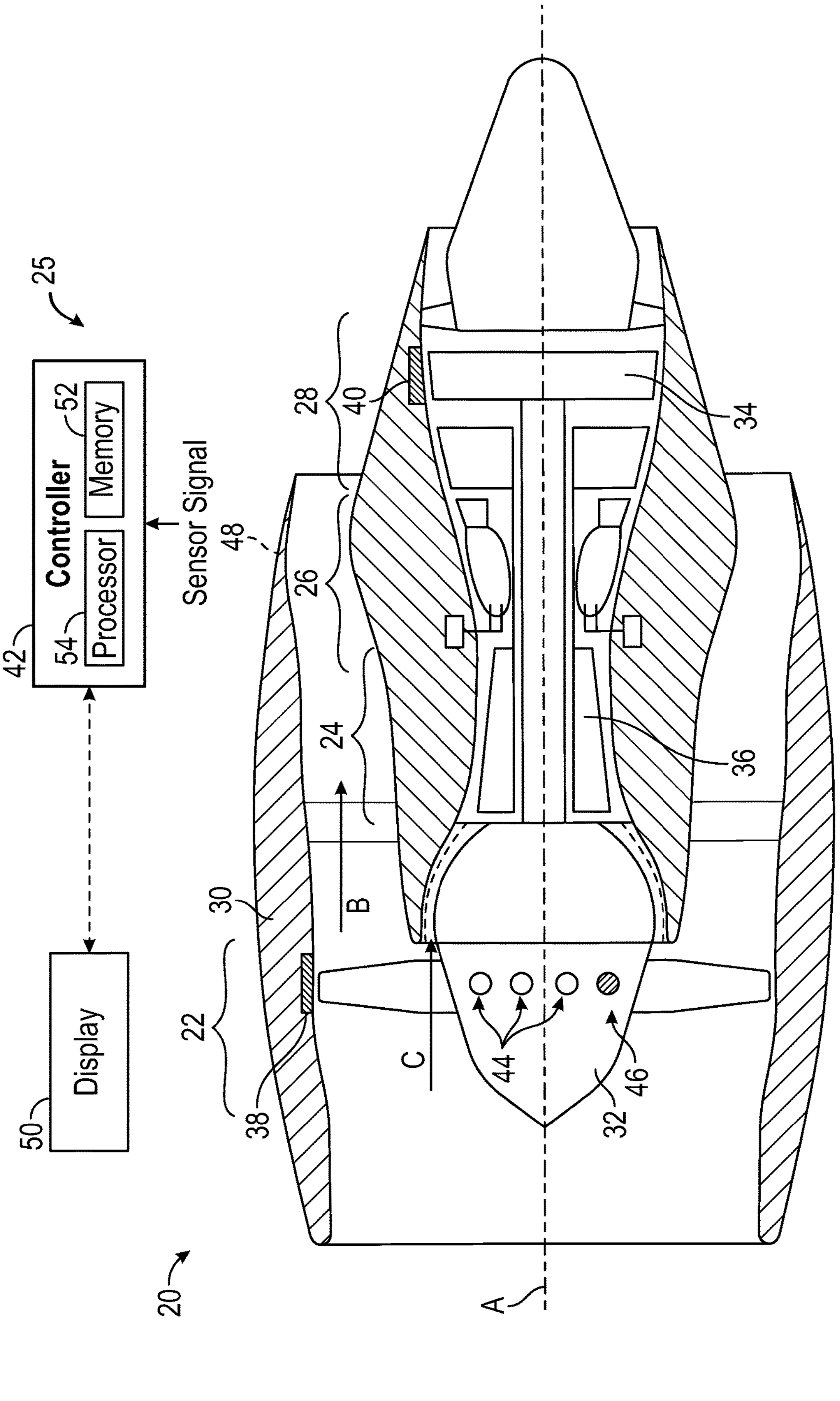
FIG. 1 is a schematic view of an example turbine engine and engine control system.

FIG. 1 schematically illustrates a gas turbine engine 20 and control system 25. The control system 25 includes a controller 42 programmed to control engine operation and that is configured to gather and analyze data during aircraft operation that may be utilized for determining a trim configuration for balancing a rotating engine structure.

The example turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The compressor section 24 drives air along a core flow path C into the combustor section 26. In the combustor section 26, the compressed air is mixed with fuel and ignited to generate an exhaust gas flow that expands through the turbine section 28 to power the fan section 22 and the compressor section 24.

Although depicted as a turbofan engine in the disclosed non-limiting embodiment, it should be understood that the concepts described herein are not limited to use with turbofans for aircraft applications as the teachings may be applied to turboshaft, turboprop, and any other turbine engine architectures and rotating structures.

The engine 20 includes rotating engine structures such as for example, the fan section 22, fan hub 32, a compressor rotor 36 and a turbine rotor 34. Each of the engine rotating structures may become imbalanced due to wear and/or other operational conditions. Such imbalanced conditions may be corrected by installing weights at predefined locations. For example, the fan hub 32 includes a plurality of trim weight holes 44. A trim weight 46 may be installed into one or several of the trim weight holes 44. The trim weight 46 may be of differing sizes, or classes and may be installed into one or several of the trim weight holes 44 to provide a desired trim configuration.

The example control system 25 receives sensor signals 48 from sensors disposed throughout the engine 20. In one example, a sensor 38 is disposed proximate the fan section 22 and a sensor 40 is disposed proximate the turbine rotor 34. The example sensors 38, 40 are examples of sensor systems associated with the engine 20 that provide information indictive of engine operation. Moreover, the sensors 38, 40 are examples of sensor systems that may provide vibration magnitude information, vibration phase information, acoustic information and any other information indicative of an imbalanced condition of an engine rotating structure.

The control system 25 includes the controller 42 with a processor 54 and memory device 52. The controller 42 provides information to a display 50 to enable viewing and selection of gathered and stored data by a maintenance operator.

The example controller 42 relates to a device and system for performing necessary computing or calculation operations of the control system 25. The controller 42 may be specially constructed, or may comprise at least a general-purpose computer selectively activated or reconfigured by software instructions stored in the memory device 52. The controller 42 may further be part of full authority digital engine control (FADEC) or an electronic engine controller (EEC).

Figure 2:
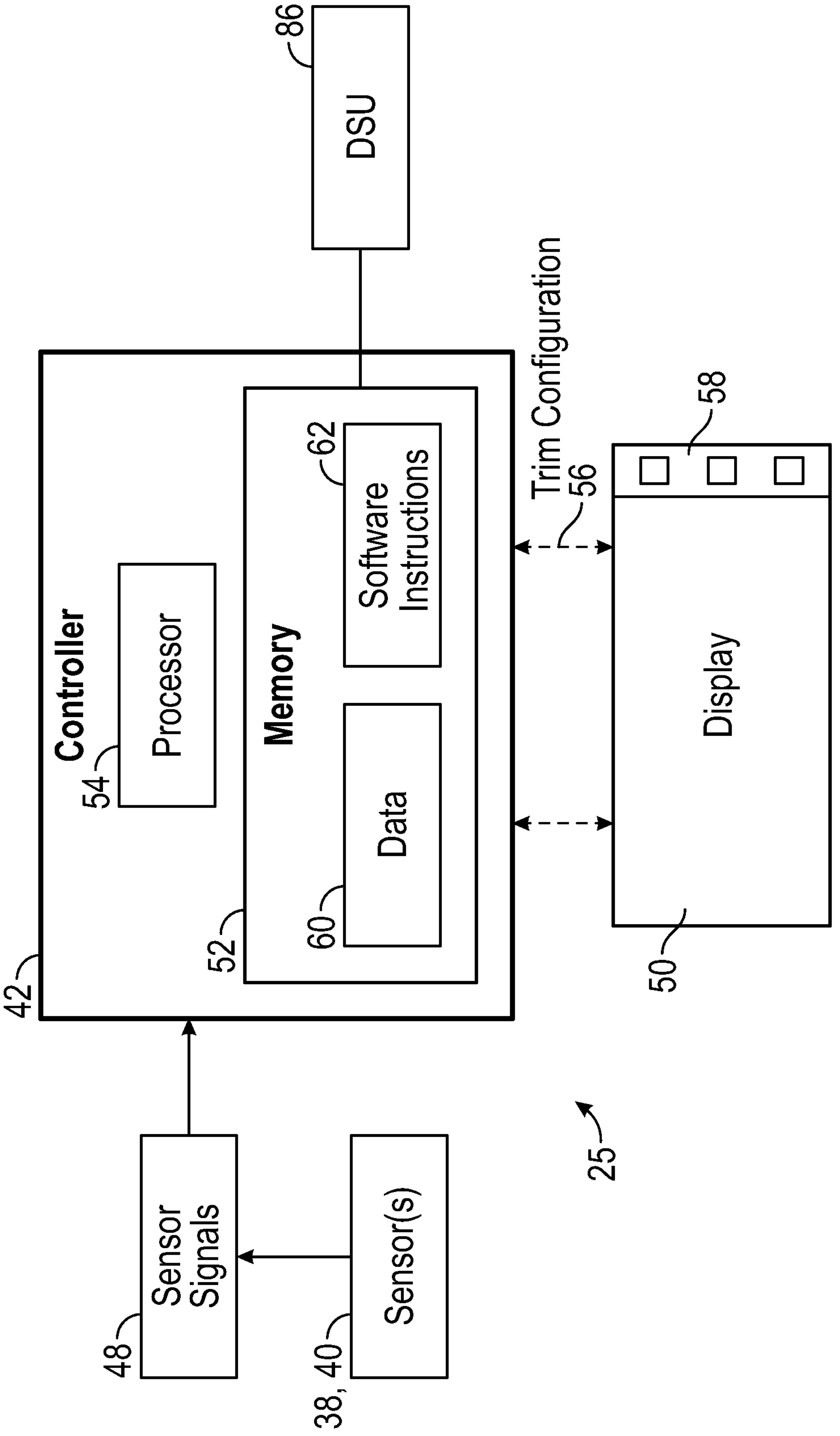
FIG. 2 is a schematic view of an example engine control system.

Referring to FIG. 2, with continued reference to FIG. 1, the controller 42 includes software instructions 62 stored in the memory 52 that are utilized by the processor 54 to perform operations required to control engine operation and to obtain, analyze and store data utilized to determine a trim configuration 56.

The software instructions 62 may include instructions for processing stored data 60 obtained from the sensors 38, 40 and utilized for determining a trim configuration. Moreover, the software instructions 62 may include instructions for displaying the data on the display device 50 and provide for operation of a selection control 58 of selecting specific data sets for use in determining the trim configuration 56.

The disclosed memory device 52, may include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions in the memory device 52 may include one or more separate programs, each of which includes an ordered listing of executable instructions for implementing logical functions. Software in memory, in whole or in part, is read by the processor 54, and executed to generate a trim configuration 56. The trim configuration 56 may be communicated through the display 50.

The example control system 25 includes all devices that operate to communicate with the engine 20 to receive information indicative of unbalanced conditions, analyze the information and store the information utilized for determination of the trim configuration 56.

Figure 3:
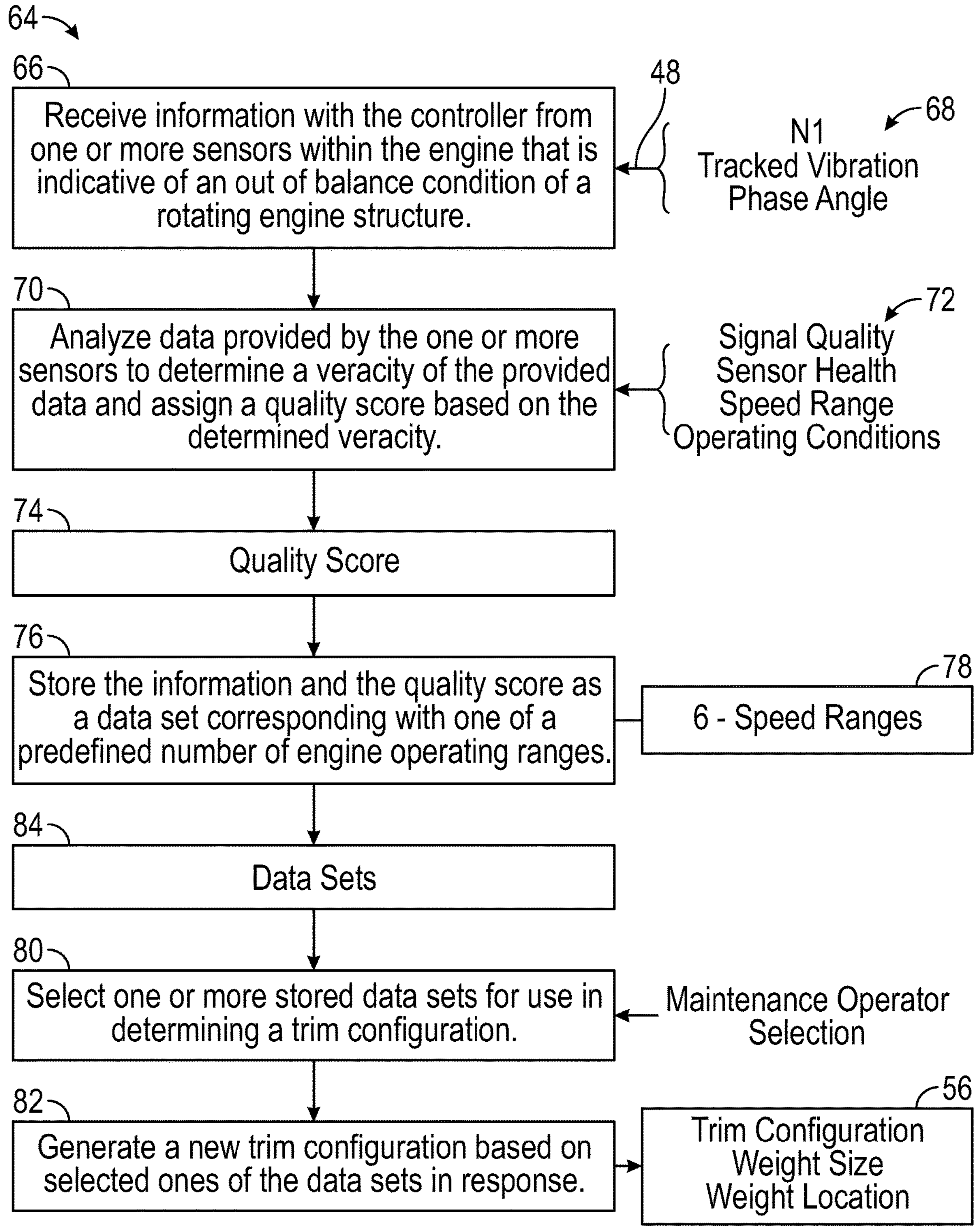
FIG. 3 is a flow diagram illustrating steps of an example method of determining a trim configuration.

Referring to FIG. 3 with continued reference to FIG. 2, an example operational embodiment of a disclosed method of determining a trim configuration is schematically shown at 64. The method includes an initial step 66 of receiving information indicative of an unbalanced condition with the controller 42. In an example embodiment, the information 68 includes speed NI, NI tracked vibration magnitude and NI tracked vibration phase angle values for a rotating engine structure. The information 68 is provided by sensors 38, 40 through signals 48 communicated to the controller 42.

Anytime the engine 20 is operating above a minimum speed, such as idle, for example, information 68 is gathered and communicated to the controller 42. The information 68 may be for specific engine rotating structures, such as the fan hub 32 of the fan section 22. The information 68 is gathered continuously during operation of the engine 20 without prompting.

The information 68 is analyzed at predefined intervals to determine a veracity of the information. In one example embodiment, information gathered over a predefined time period is analyzed to determine veracity. In one disclosed example, the predefined time period is 10 seconds. In another disclosed example the predefined period may more or less than 10 seconds. Moreover, although a fixed predefined time period is disclosed by way of example, the predefined time period may vary based on a selected operation criterion such as, for example, altitude and engine speed.

The veracity of the information 68 can be influenced by different operational conditions and phenomena. For example, ice build-up on rotating portions of the engine 20 can be reflected in the information 68 as an unbalanced condition. Moreover, information 68 that does not make sense for an engine operating condition may be indictive of a faulty sensor rather than an unbalanced condition. Accordingly, the example controller 42 analyzes the information 68 for anomalies and inconsistencies as indicated at 70. The analysis of the information 68 can include examination of parameters 72 that influence the quality of the information. In one example information the examination parameters 72 can include, among other things, signal quality, sensor health, engine speed range and engine operating conditions.

The analysis conducted on the information 68 for the predefined time period is utilized to assign a quality score 74. The quality score 74 is an indication of the veracity of the information over the predefined time period. The quality score 74 further provides a means of selecting which data is utilized for determining the trim configuration 56.

The parameters 72 may include a determination of which sensors 38, 40 are being utilized for each data set. The quality score 74 may determine which sensor is being utilized for providing information and factor the specific sensor into the determination of a quality score. In many engine configurations, more than one sensor at different locations are utilized to monitor operation of a single rotating components. Accordingly, several different signals may provide information for a one component. The different signals may be compared to further determine accuracy and quality of the information. If the signal differ substantially, that difference can be factored into the quality score, and/or may even be utilized to prompt the system to entirely dismiss that data set 84. Many different factors may be utilized to confirm the veracity of the obtained information for each data set 84. Although several examples of evaluation criteria as described, other factors may also be utilized and are within the contemplation of this disclosure.

The analyzed information 68 and corresponding quality score 74 are stored, as indicated at 76, as data 60 in the memory device 52. The stored data 60 comprises individual data sets 84 that include the information 68 and corresponding quality score 74. Each of the individual data sets 84 corresponds with a predefined engine operating range. In one example embodiment, the operating range includes rotational speed ranges 78. The speed ranges 78 are divided into six different ranges in one example embodiment. As appreciated, although six ranges are disclosed by way of example, any number of speed ranges could be used within the contemplation and scope of this disclosure.

The speed ranges 78 may be indicative of different aircraft operating conditions. For example, the speed ranges 78 may cover different lets of a typical flight cycle. Such a flight cycle may include taxi, take-off, climb, cruise, descent and landing. Moreover, the operating ranges may include other divisions that aid in accumulating data sufficient to generate the trim configuration 56.

The controller 42 stores one data set 84 for each engine operating condition. In this example, six data sets 84 comprising six predefined speed ranges are stored in the memory 52. After each predefined time period, current information is analyzed and assigned a quality score 74. The controller 52 compares the stored data set for the current speed range with the latest data set and keeps the data set with the best quality score 74. Accordingly, if the most recently analyzed data set has a quality score that is better than the currently saved data set, the more recent data set will be saved for that predefined speed range. The comparison of quality scores and updating of the saved data set is continuous such that the resulting data 60 in the memory represents the best quality data sets for each operating range.

Accordingly, in one disclosed example, the data 6( ) in the memory will include six data sets 84, one data set 84 with the highest quality score for each speed range. The process of evaluating, updating and replacing data sets 84 continues throughout the flight cycle for each operating range and remain stored in memory 52. The data sets 84 that make up the stored data 60 are updated during each flight cycle until a rebalancing operation is warranted.

The example controller 42 includes multiple channels that provide redundancy to assure consistent engine operation. In one disclosed example, the controller 42 operates two channels. Accordingly, the example system 25 operates simultaneously on both channels such that a redundancy is built in to assure that the data sets 84 are present for use during rebalancing operations.

Rebalancing for any rotating engine component may be prompted based on any criteria ranging from preference to a pre-scheduled maintenance operation. Upon the initiation of a rebalancing operation, the system 25 is accessed by a maintenance operator through the display 50. The system 25 provides a means of viewing and selecting one or more of the data sets 84 for use in generating the trim configuration. In one example embodiment, the display 50 is part of the aircraft and includes selection controls 58. The display 50 provides for viewing of the stored data sets 84 and the selection controls 58 enable the operator to select one or more of the data sets as is indicated at 80.

The display 50 may also be incorporated into a device separate from the aircraft that can access the data 60 stored in memory 52. For example, the display 50 and the associated selection controls 58 may be part of a remote communication device that is permitted access to the data stored in memory 52.

The saved data sets 84 represent the best quality data for each operating range 78. The data set 84 that is selected for determination of the trim configuration 56 can be based on the quality score 74, operating range 78 or other factors related to engine and aircraft operation. Additionally, the control system 25 may be configured to provide a recommended data set for use based on a predefined criterion, such as quality score 74.

Selection of which data set 84 to utilized for determination of the trim configuration 56 may be at the discretion of the maintenance operator. The selection may be directed to provide a trim balance configuration at a specific speed range 78. The selection process may also be based on the data set 84 that is indictive of the highest vibration magnitude.

The determination of the trim configuration 56 may utilize formula, conversion factors and other information that is stored on a data storage unit 86 (DSU) (FIG. 2). The DSU 86 is separate from the memory 52 and can be updated without updating the controller 42 and/or system 25. The DSU 86 provides for upgrades and improvements in the trim determination processes performed by the controller 42 on a more frequent basis. The DSU 86 provides the ability to update influence coefficients that are utilized in determining the trim configuration. The influence coefficients may include conversion factors for transforming the vibration data provided in the data sets 84 into the trim configuration that defines what size weight and where the weight should be installed to reduce or eliminate vibration.

Once the desired data set(s) are selected, the system 25 will run a balancing routine to generate the trim configuration 56 as indicated at 82. The control system 25 includes information on a current trim configuration including what, if any, trim weights are installed and the location of those weights. In one example embodiment, the fan hub 32 includes the trim weight holes 44 and one trim weight 46. The system 25 factors in the current trim configuration during the generation of a new trim configuration 56.

The determined trim configuration 56 is than communicated to the operator and includes a listing of what class of weight is to be installed in which trim weight hole 44. The system 25 will update the current trim configuration stored in memory so that any further balancing operations will begin with the actually installed trim weight configuration. The system 25 may update automatically or based on confirmation from the operator.

Moreover, although the system 25 is described by way example as providing a trim configuration that includes placement of trim weights in predefined openings, other trim operations could also be utilized. For example, the system 25 may provide guidance on replacement of one or more features of a rotating structure or how to modify existing components by adding or removal of material.

The system 25 will continue to gather data automatically at the start of the next engine operation. The data 60 will be updated as new information is obtained and assigned quality scores. The system 25 may simply erase all old data when a new trim configuration is installed or continue normally with new data of better quality replacing old data based on the previous trim configuration.

A control system 25 for a turbine engine assembly 20 according to one example embodiment, includes, among other possible things, a controller 42 operable to control operation of the turbine engine assembly 20 and to determine a trim configuration 56 to balance a rotating engine structure 32, 36, 34 associated with the turbine engine assembly 20, the controller 42 including a processor 54 and a memory 52 for storing information indicative of operation of the rotating engine structure 32, 34, 36, wherein the controller 42 is programmed to determine the trim configuration 56 by receiving information from one or more sensors 38, 40 within the turbine engine assembly 20 that is indicative of an out of balance condition of the rotating engine structure 32, 34, 36, analyzing data provided by the one or more sensors 38, 40 to determine a veracity of the provided data and assigning a quality score based on the determined veracity, storing the information and the quality score as a data set in the memory 52 that corresponds with one of a predefined number of engine operating ranges, providing a means of selecting 50 one or more stored data sets for use in determining a trim configuration 56, and generating a new trim configuration 56 based on selected ones of the data sets.

In another embodiment of the forgoing control system, the predefined number of engine operating ranges comprise multiple ranges of engine rotational speeds.

In another embodiment of any of the foregoing control systems 25, each data set includes a rotational speed, a tracked vibration magnitude and a tracked vibration phase angle for a predefined duration for each range of engine rotational speeds.

In another embodiment of any of the foregoing control systems 25, the determination of data veracity is based, at least in part, on a stability of a signal received from the one or more sensors 38, 40.

In another embodiment of any of the foregoing control systems 25, the determination of data veracity is based, at least in part, on data corresponding with predefined conditions indicative of inaccurate data.

In another embodiment of any of the foregoing control systems 25, further including replacing a previously stored data set with a subsequent data set assigned a better quality score.

In another embodiment of any of the foregoing control systems 25, further including referring to stored information indicative of a current trim configuration 56 when generating the new trim configuration 56.

In another embodiment of any of the foregoing control systems 25, further including replacing the current trim configuration 56 with the new trim configuration 56 and saving the new trim configuration 56 in the memory 52.

In another embodiment of any of the foregoing control systems 25, the means for selecting one or more of the dates sets comprises a visible display 50 accessible to a maintenance operator.

A method of determining a trim configuration 56 for balancing rotating engine structure 32, 34, 36 with a controller 42 configured to control operation of an engine according to another example embodiment includes, among other possible things, receiving information with the controller 42 from one or more sensors 38, 40 associated with the engine that is indicative of an out of balance condition of the rotating engine structure 32, 34, 36, analyzing data provided by the one or more sensors 38, 40 to determine a veracity of the provided data and assigning a quality score based on the determined veracity, storing the information and the quality score as a data set corresponding with one of a predefined number of engine operating ranges, providing a means of selecting 50 one or more stored data sets for use in determining a trim configuration 56, and generating a new trim configuration 56 based on the selected data sets.

In another embodiment of the foregoing method, the predefined engine operating ranges comprise multiple ranges of engine rotational speeds.

In another embodiment of any of the foregoing methods, each data set includes a rotational speed, a tracked vibration magnitude and tracked vibration phase angle for a predefined duration for each range of engine rotational speeds.

In another embodiment of any of the foregoing control systems 25, the determination of data veracity is based, at least in part, on a stability of a signal received from the one or more sensors 38, 40.

In another embodiment of any of the foregoing control systems 25, the determination of data veracity is based, at least in part, on data corresponding with predefined conditions indicative of inaccurate data.

Another embodiment of any of the foregoing control systems 25, further includes replacing a previously stored data set with a subsequent data set assigned a better quality score.

Another embodiment of any of the foregoing control systems 25, further includes referring to information stored in a memory 52 associated with the controller 42 that is indicative of a current trim configuration 56 when generating the new trim configuration 56 and replacing the current trim configuration 56 with the new trim configuration 56 in the memory 52.

In another embodiment of any of the foregoing control systems 25, the means for selecting one or more of the dates sets comprises a visible display 50 accessible to a maintenance operator and the method further comprises generating a visible and manipulatable display 50 for viewing that includes features enabling selection of one of the stored data sets for use in generating the new trim configuration 56.

An engine assembly 20 for an aircraft according to another example embodiment includes, among other possible things, at least one rotating engine structure 32, 34, 36 including a plurality of locations configured to receive a weight element according to a determined trim configuration 56, one or more sensor systems configured for measuring rotation of the at least one rotating engine structure 32, 34, 36 and for generating signals indictive of balance conditions of the at least one rotating engine structure 32, 34, 36, and a controller 42 operable to control operation of the engine assembly 20 and for determining the trim configuration 56, the controller 42 including a processor 54 and a memory 52 for storing information indicative of operation of the rotating engine structure 32, 34, 36. The controller 42 is programmed to determine the trim configuration 56 by receiving information from the one or more sensor systems associated with the engine assembly 20 that is indicative of an out of balance condition of the at least one rotating engine structure 32, 34, 36, analyzing the information provided by the one or more sensor systems to determine a veracity of the provided information and assigning a quality score based on the determined veracity, storing the information and the quality score as a data set in the memory 52 that corresponds with one of a predefined number of engine operating ranges, providing a means of selecting 50 one or more stored data sets for use in determining a trim configuration 56, and generating a new trim configuration 56 based on selected ones of the data sets.

In another embodiment of any of the foregoing engine assemblies, each data set includes a rotational speed, a tracked vibration magnitude and a tracked vibration phase angle for a predefined duration for each of a plurality of ranges of engine rotational speeds.

In another embodiment of any of the foregoing engine assemblies, the means for selecting one or more of the dates sets comprises an operator accessible visible display 50.

Accordingly, the example control system 25 provides an assurance of data utilized for balancing rotating engine components and for tailoring such balancing to engine specific operating conditions.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A control system for a turbine engine assembly, the control system comprising:

a controller programmed to control operation of the turbine engine assembly and to determine a trim configuration to balance a rotating engine structure associated with the turbine engine assembly, the controller including a processor and a memory for storing information indicative of operation of the rotating engine structure, wherein the controller is programmed to determine the trim configuration by:

receiving information from one or more sensors within the turbine engine assembly that is indicative of an out of balance condition of the rotating engine structure, wherein the information includes a speed of a rotating engine structure, tracked vibration magnitude and a tracked vibration phase angle for the rotating engine structure;

analyzing data provided by the one or more sensors to determine a veracity of the provided data and assigning a quality score based on the determined veracity, wherein the determination of data veracity is based on a stability of a signal received from the one or more sensors, wherein sensor stability is a measure of a signal remaining constant for a predetermined time;

storing the information and the quality score as a data set in the memory that corresponds with one of a predefined number of engine operating ranges, wherein the predefined number of engine operating ranges comprise multiple ranges of engine rotational speeds;

providing a means of selecting one or more stored data sets for use in determining a trim configuration; and generating a new trim configuration based on selected ones of the data sets.

2. The control system as recited in claim 1, wherein the determination of data veracity is based, at least in part, on data corresponding with predefined conditions indicative of inaccurate data.

3. The control system as recited in claim 1, further comprising replacing a previously stored data set with a subsequent data set assigned a better quality score.

4. The control system as recited in claim 1, further comprising referring to stored information indicative of a current trim configuration when generating the new trim configuration.

5. The control system as recited in claim 4, further comprising replacing the current trim configuration with the new trim configuration and saving the new trim configuration in the memory.

6. The control system as recited in claim 1, wherein the means for selecting one or more of the dates sets comprises a visible display accessible to a maintenance operator.

7. A method of determining a trim configuration for balancing rotating engine structure with a controller configured to control operation of an engine, the method comprises:

operating an aircraft engine assembly to drive rotation of a fan by expanding a gas flow generated by combustion of a compressed airflow from a compressor with fuel in a combustor section;

receiving information with the controller from one or more sensors associated with the engine that is indicative of an out of balance condition of the rotating engine structure, wherein the information includes a speed of a rotating engine structure, tracked vibration magnitude and a tracked vibration phase angle for the rotating engine structure;

analyzing data provided by the one or more sensors to determine a veracity of the provided data and assigning a quality score based on the determined veracity, wherein the determination of data veracity is based on a stability of a signal received from the one or more sensors, wherein sensor stability is a measure of a signal remaining constant for a predetermined time;

storing the information and the quality score as a data set corresponding with one of a predefined number of engine operating ranges;

providing a means of selecting one or more stored data sets for use in determining a trim configuration; and generating a new trim configuration based on the selected data sets.

8. The method as recited in claim 7, wherein the predefined engine operating ranges comprise multiple ranges of engine rotational speeds.

9. The method as recited in claim 8, wherein each data set includes a rotational speed, a tracked vibration magnitude and tracked vibration phase angle for a predefined duration for each range of engine rotational speeds.

10. The method as recited in claim 7, wherein the determination of data veracity is based, at least in part, on a stability of a signal received from the one or more sensors.

11. The method as recited in claim 7, wherein the determination of data veracity is based, at least in part, on data corresponding with predefined conditions indicative of inaccurate data.

12. The method as recited in claim 7, further comprising replacing a previously stored data set with a subsequent data set assigned a better quality score.

13. The method as recited in claim 7, further comprising referring to information stored in a memory associated with the controller that is indicative of a current trim configuration when generating the new trim configuration and replacing the current trim configuration with the new trim configuration in the memory.

14. The method as recited in claim 7, wherein the means for selecting one or more of the dates sets comprises a visible display accessible to a maintenance operator and the method further comprises generating a visible and manipulatable display for viewing that includes features enabling selection of one of the stored data sets for use in generating the new trim configuration.

15. An engine assembly for an aircraft comprising:

at least one rotating engine structure, the at least one rotating engine structure including a plurality of locations configured to receive a weight element according to a determined trim configuration, wherein the at least rotating engine structure is part of at least one of a compressor section, turbine section and a fan section;

one or more sensor systems configured for measuring rotation of the at least one rotating engine structure and for generating signals indictive of balance conditions of the at least one rotating engine structure; and a controller operable to control operation of the engine assembly and for determining the trim configuration, the controller including a processor and a memory for storing information indicative of operation of the rotating engine structure, wherein the controller is programmed to determine the trim configuration by:

receiving information from the one or more sensor systems associated with the engine assembly that is indicative of an out of balance condition of the at least one rotating engine structure, wherein the information includes a speed of a rotating engine structure, tracked vibration magnitude and a tracked vibration phase angle for the rotating engine structure;

analyzing the information provided by the one or more sensor systems to determine a veracity of the provided information and assigning a quality score based on the determined veracity, wherein the determination of data veracity is based on a stability of a signal received from the one or more sensors, wherein sensor stability is a measure of a signal remaining constant for a predetermined time;

storing the information and the quality score as a data set in the memory that corresponds with one of a predefined number of engine operating ranges;

providing a means of selecting one or more stored data sets for use in determining a trim configuration; and generating a new trim configuration based on selected ones of the data sets.

16. The engine assembly as recited in claim 15, wherein each data set includes a rotational speed, a tracked vibration magnitude and a tracked vibration phase angle for a predefined duration for each of a plurality of ranges of engine rotational speeds.

17. The engine assembly as recited in claim 16, wherein the means for selecting one or more of the dates sets comprises an operator accessible visible display.

18. The control system as recited in claim 1, wherein the controller if further programmed to determine veracity of the provided data by detecting anomalies and inconsistencies in data provided by the one or more sensors.

19. The control system as recited in claim 1, wherein the one or more sensors comprises a plurality of sensors disposed in different locations and each of the plurality of sensors generate separate information indicative of an out of balance condition of a rotating engine structure and the veracity of the sensor data is determined based at least in part by a comparison between information from each of the plurality of sensors, wherein a difference between information gathered by the plurality of sensors is at least partially used to assign the quality score.

20. The control system as recited in claim 19, wherein the controller is further programmed to dismiss a data set based on a quality score indicating that the difference between information gathered between the plurality of sensors is greater than a predefined acceptable difference.

* * * * *